May 2, 1950 J. B. SISSON 2,505,997
INTERMITTENT, MOLTEN MATERIAL, PRESSING MACHINE
Filed Aug. 11, 1944 3 Sheets-Sheet 1

INVENTOR.
JOHN B. SISSON.
BY
Lockwood, Goldsmith & Galt.
ATTORNEYS.

May 2, 1950 J. B. SISSON 2,505,997
INTERMITTENT, MOLTEN MATERIAL, PRESSING MACHINE
Filed Aug. 11, 1944 3 Sheets-Sheet 2

INVENTOR.
JOHN B. SISSON.
BY
Lockwood, Goldsmith & Galt.
ATTORNEYS.

May 2, 1950 J. B. SISSON 2,505,997
INTERMITTENT, MOLTEN MATERIAL, PRESSING MACHINE
Filed Aug. 11, 1944 3 Sheets-Sheet 3

INVENTOR.
JOHN B. SISSON,
BY
Lockwood, Goldsmith & Galt
ATTORNEYS.

Patented May 2, 1950

2,505,997

UNITED STATES PATENT OFFICE 2,505,997

INTERMITTENT, MOLTEN MATERIAL, PRESSING MACHINE

John B. Sisson, Marion, Ind.

Application August 11, 1944, Serial No. 549,016

8 Claims. (Cl. 49—29)

This invention relates to means for simultaneously forming a plurality of articles from plastic and more particularly molten vitreous material.

These articles may be alike, totally dissimilar, or complementary as desired or required.

It is old in the glass art to provide a rotary table with gob receiving molds on the face thereof and at one station in the table rotation supply the glass gob thereto, at a second station apply a pressing plunger to the mold, advance the plunger transverse to the plane of rotation, form the article in the mold and then retract the plunger, and at a third station remove the article from the mold.

The foregoing practice, accordingly, is inherently limited in capacity in the successive production of like articles.

The present invention, as stated, is directed to the simultaneous production of like, dissimilar and/or complementary articles upon a rotary member and at each advance of said member.

The number produced at one time is only limited by the diameter of the member and its length, whereas in the prior art the diameter of the table is critical and of limiting character.

The chief feature of the present invention resides in the mold supporting rotatable cylinder and associating therewith a pressing plunger supporting rotatable cylinder so that for each indexing step of the cylinders a plurality of glass or like articles will be formed, and for successive indexing thereof successive articles will be formed.

Other objects and features of the invention will be set forth more fully hereinafter.

The full nature of the invention will be understood from the accompanying drawing and the following description and claims:

In the drawing Fig. 1 is a top plan view of the power applying end of the device embodying the invention and herein three annular series of molds and plungers are illustrated.

Fig. 2 is a partial elevation of the invention with the parts broken away for the purpose of clarity or the like.

Figure 1:
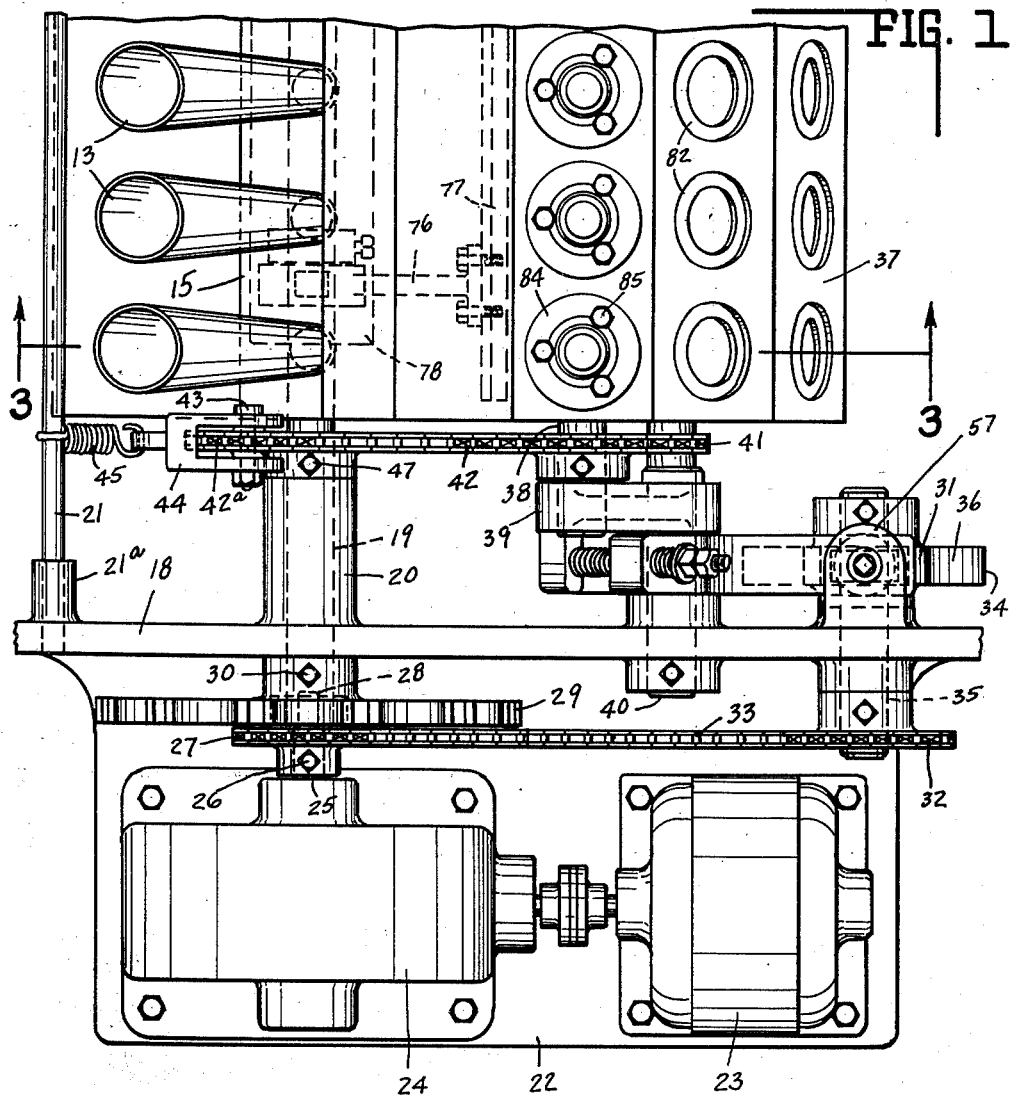
Figure 2:
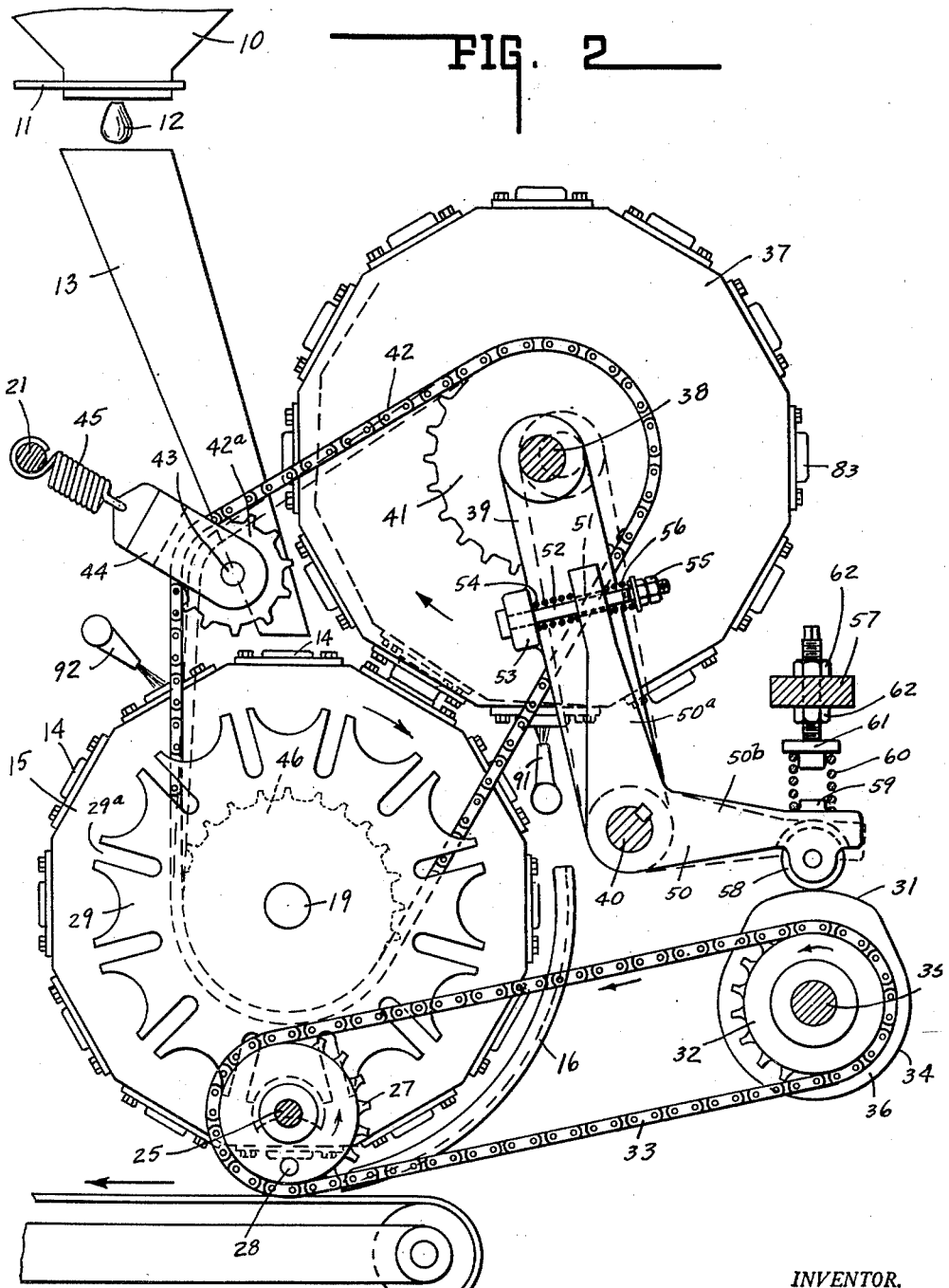
Figure 3:
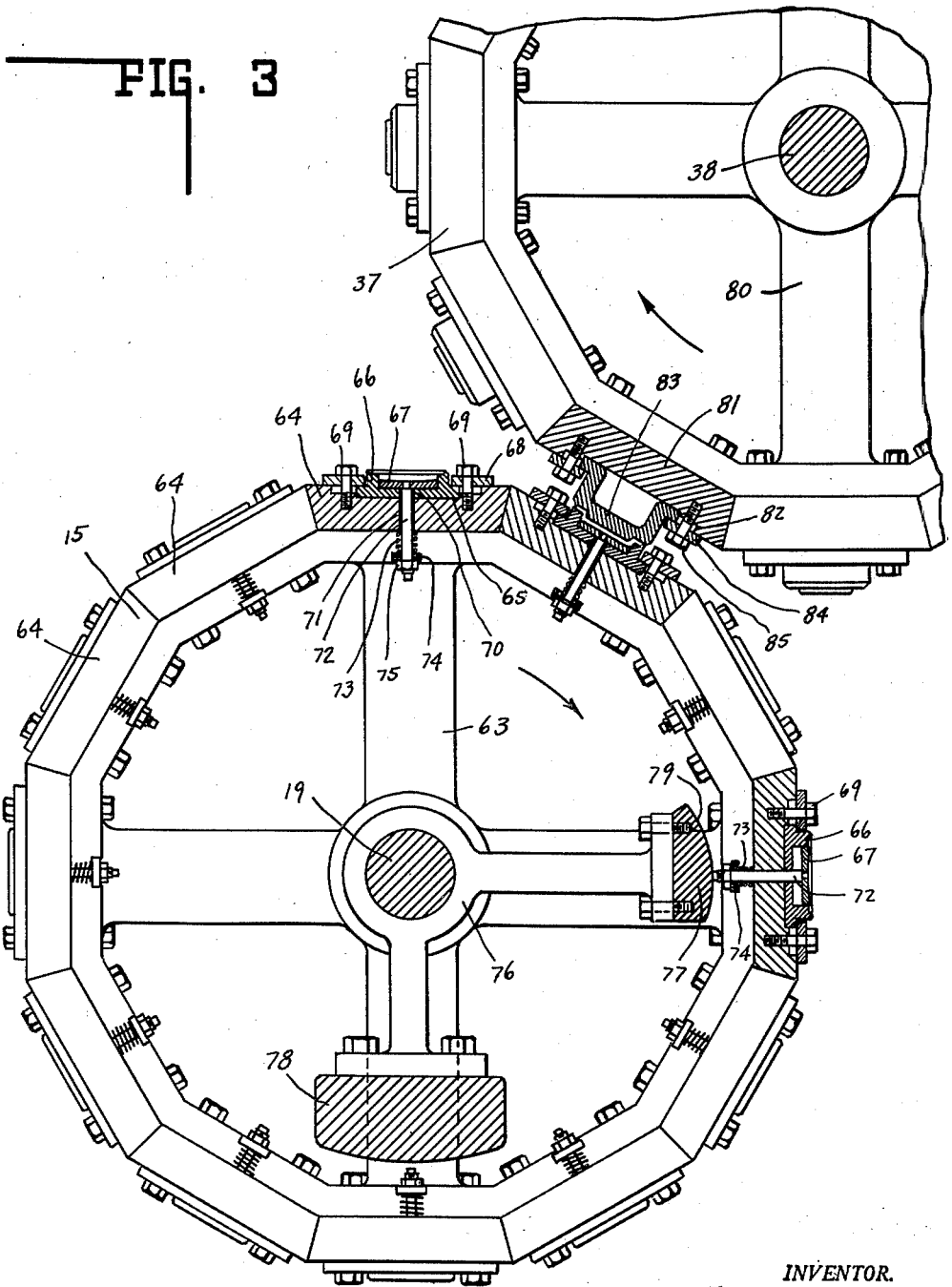
Fig. 3 is a sectional view taken on line 3—3 of Fig. 1 and in the direction of the arrows, certain of the individual plates, molds and plungers, however, only being shown in section, others being shown in elevation.

In Figs. 1, 2 and 3 the parts are illustrated in the pressing position, dotted lines in Fig. 2, however, indicating the plunger in retracted or non-pressing position.

In Fig. 2 of the drawings 10 indicates a feeder for molten glass, associated with which is a shears 11 operable in timed relation to form a gob 12 which herein, upon severance, drops into the chute 13 for discharge to a glass mold 14 therebeneath. This mold is carried by a cylinder 15 adjacent which is positioned a catcher or transfer chute 16 that discharges to an off-bearing belt 17 below said cylinder. This belt is of cylinder width and may have any peripheral speed sufficient for article removal.

Reference will now be had to Fig. 1. Herein 18 indicates an end frame of the machine and same includes the boss or bearing 20 for the shaft 19 supporting the cylinder 15. It also includes socket 21a which mounts the frame end connector or stanchion 21. Although not illustrated herein, same may detachably and adjustably support the several chutes 13 by suitable means; note its proximity in Fig. 2.

The end frame 18, see Fig. 1, includes an outwardly projecting base flange 22 upon which is suitably mounted a motor 23 driving reduction unit 24 also mounted upon the flange. Unit 24 includes shaft 25 to which is pinned as at 26 the collar of sprocket 27 having an eccentric pin 28 projecting from its face toward the end frame 18.

The Geneva movement wheel 29 has its hub pinned as at 30 to the frame projecting end of shaft 19. By this means the continuously rotating motor 23 is adapted to intermittently advance or index the shaft 19 one step in the clockwise direction of sprocket 27.

Mounted in frame 18 is a shaft 35 which projects oppositely therefrom and on its outer end mounts sprocket 32. A chain 33 meshing with sprockets 32 and 27 thus rotates shaft 35 once for each revolution of shaft 25. Shaft 35 has adjustably secured to its inner end the pressing cam 36. This cam has a high portion 31 and the low portion 34, the purpose of which will appear more fully hereinafter.

Herein adjacent the molding cylinder 15 and parallel thereto, but slightly offset therefrom, is a pressing plunger supporting cylinder 37 having herein a like number of "faces" as the cylinder 15. This cylinder 37 is supported by a shaft 38 in turn rotatably supported in the upper ends of arms 39 oscillatably supported at the opposite ends on rockshaft 40 rotatably supported by the two end frames.

A sprocket 41 carried by shaft 38 between cylinder 37 and the power end arm 39 meshes with sprocket chain 42 that meshes with a sprocket idler 42a carried by shaft 43 in the bifurcated member 44 spring connected to cross member 21 by spring 45. The chain 42 also meshes with a sprocket 46 rigid with the shaft 19 as at 47, see Fig. 1.

Since sprockets 41 and 46 are alike as to teeth, it will be obvious that the cylinders have the same advance or indexing movement and in the same direction. However, note that the two approach each other, as it were, from "opposite" directions, that is the lower part of cylinder 37 approaches the upper part of cylinder 15.

Herein rigidly mounted upon the power end of shaft 40 is a bell crank 50. The upper arm 50a thereof lies adjacent arm 39 and its end is apertured at 51 in which is slidably mounted bolt 52. There is another arm 50a at the opposite end of the machine. Each arm 39 carries a lateral boss 53 which rigidly mounts said bolt 52. Between each boss 53 and its adjacent arm 50a and concentric with said bolt 52 is a spring 54. The free end of this bolt 52 is threaded and on the end of same is the adjustable spring retainer 55 comprising a washer, nut and lock nut. Between same and the arm portion 50a and concentric with the bolt 52 is a spring 56. This is a pressure regulating and cushioning structure.

Extending inwardly from the power end frame 18 is the boss 57 which herein overlies the cam 36. Interposed therebetween is the other end 50b of the bell crank 50 and carried thereby is a cam follower roll 58. Opposite therefrom is spring locator 59. A spring 60, associated therewith, normally constrains the roller 58 and bell crank 50 toward the cam 36. The other end of the spring 60 is associated with a retainer 61 adjustably mounted in boss 57 and retained in adjusted position by lock nuts 62. Retainer 61 may be threaded into said boss 57 if desired.

When the cam 36 is rotated, it permits the bell crank 50 to move clockwise due to power spring 60, which results in the cylinder 37 being moved upwardly and to the right, see dotted line. While so positioned the two cylinders are advanced one step. Following this cam advance the high point 31 rocks the bell crank 50 counter clockwise so that the cylinder 37 is then moved to the left and downwardly to cooperate with the cylinder 15 as hereinafter set forth. Springs 52 and 56 provide a safety cushion for die protection and constitute a resilient adjustment to prevent die jamming.

Reference will now be had to Fig. 3 more particularly. Herein cylinder 15 is comprised of at least two end spiders or frames 63 and suitably secured thereto and about the periphery thereof are the face plates 64. Each of said face plates includes a longitudinal series of spaced sockets 65 detachably seating a female mold 66 having a movable bottom portion 67. Said mold is retained in said socket as by means of cap member 68 and bolts 69.

Each mold herein is apertured at 70 and each plate 64 coincident with the socket and aligned with aperture 70 is similarly apertured as at 71. Rigid with the mold bottom member 67 is the stem 72 that is slidable in apertures 70 and 71 and projects into the cylinder 15.

Concentric with said stem 72 and bearing at one end upon the inner face of the adjacent plate 64 is the coiled spring 73 having its inner end seated in a cup retainer 74 secured on the stem by nut 75 threaded thereon. Spring 73 normally constrains the ejector type mold bottom member 67 in proper molding position.

Herein between each adjacent pair of cylinder spiders 63 and adjacent the same are the bell cranks 76 rotatably mounted on the shaft 19.

These two bell cranks are suitably connected together as by the elongated cam member 77 and the elongated counter weight member 78.

The number of these structures is that of the number of spiders 63 less one. Normally the weight 78 constrains the cam toward a position such that the cam face 79 is engaged by the approaching inner ends of stems 72 and said stems are forced radially outward, as it were, in opposition to spring 73.

In this manner members 67 are moved radially outward to eject the articles previously formed and then seated in the female molds 66. Following this action in the clockwise indexing of cylinder 15, the counterweighted cam is left behind by the previously cam actuated stems and is subsequently engaged by the approaching longitudinal series of stems 72. The mass of the counterweight is such that the foregoing action occurs and it is not objectionable if such cam structure has slight oscillation at each advance of cylinder 15, the ejecting cam always, however, returning to ejecting position by gravity. The ejected formed articles are received by transfer chute 16 before mentioned.

Referring again to Fig. 3, it will be understood that cylinder 37 is similarly constructed, that is same comprises a suitable number of spiders 80 rigid upon shaft 38 and rotatable and oscillatable therewith. These spiders are connected together by elongated face plates 81, each of which includes a longitudinal series of male die or plunger seating sockets 82. Seated in each is the male die or plunger 83 retained by cap 84 secured by bolts 85.

This male die 83 is complementary to the female die 66 and between the two the gob of glass is pressed to shape in the oscillatory movement of cylinder 37 toward cylinder 15, while both are not rotating. Following pressing the cylinder 37 is retracted from cylinder 15 and when sufficient clearance therebetween is attained, the Geneva movement is so timed to advance each cylinder an amount sufficient to present a similar set of dies or rather simultaneously present two longitudinal series of complementary dies together.

It will be quite apparent that since the dies are detachable, the setup can produce all like articles. When desired, the dies of one longitudinal series may differ from those of another or adjacent series. When desired, the dies of one annular series may differ one from another.

Structure herein disclosed is capable of rapidly producing an extremely large number of like articles per unit of time, half that number of sets of complementary articles and one-third that number of sets of articles requiring three different pieces of ware.

Whenever desired or required, see Fig. 2, each die may be subject to nozzle action. The male dies have associated therewith a longitudinal series of nozzles 91 and the female dies may be similarly associated with a longitudinal series of nozzles 92. Each nozzle directs fluid under pressure onto the die. This, preferably, is of timed intermittent character. The fluid may be air which cools the mold and cleans same of dust, etc., which might collect thereon. The fluid also may be one of compatible lubricant character common to the industry. This nozzle 92 is associated with die 66 just before it receives the gob 12 and nozzle 91 is associated with die 83 just before it presses the gob to form.

It will clearly appear from Fig. 2 that the gobs are gravity supplied to molds 66 when at the twelve o'clock position, the article is pressed at the one o'clock position, cools at the two o'clock position and is ejected at the three o'clock position. For all succeeding stations the several female molds cool and may be inspected by an operator at the left of the machine in Fig. 1. The dies of cylinder 37 may be inspected by an operator at the right of said cylinder.

Obvious structural details of the machine embodying the invention disclosed herein intentionally have been omitted in the interests of brevity and clarity.

It is to be noted that the drive of the two cylinders is so timed by chain 42 that it always rotates cylinder 37 to the same degree as cylinder 15 is rotated, notwithstanding the oscillatory movement of cylinder 37, the latter movement occurring only between successive advances of the cylinders.

The "throw" in oscillation of cylinder 37 and the pressing duration may be adjusted to that desired or required by the selection of the proper cam 36 and associated mechanism. As stated, cylinder 37 always is retracted sufficient for die clearance before cylinder advance occurs and cylinder advance always has ceased prior to cylinder 37 moving toward cylinder 15 to effect pressing. The plunger dwell naturally may be that required or desired and the same can be regulated by the cam 36, the Geneva wheel and its pin, etc.

It is especially to be noted that when pressing occurs, the two confronting dies have complete peripheral contact, thereby completely closing the then cooperating dies, but the dies have relative longitudinal pressing movement therebetween.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In apparatus for molding glass and like articles said apparatus having adjacent step-by-step rotatable polygonal reels with peripherally disposed molds upon one reel and peripherally disposed complementary pressing plungers on the other, the molds being successively supplied at an upper station with glass and the like and pressed at a subsequent station, and ejection means at a lower station, the mold reel having a fixed axis of rotation, the plunger reel axis of rotation being movable toward and away from the mold reel axis, the combination therewith of constantly rotating power means, an intermittent drive therefrom to the mold reel for intermittent progressive step-by-step rotation thereof, a cyclic cam continuously rotatable by the power means, a tiltable support for the plunger reel and cyclically cam operable, and a driving connection between the reels for synchronous rotation thereof.

2. Apparatus as defined by claim 1 wherein the driving connection effects plunger reel rotation in the same direction as mold reel rotation.

3. Apparatus as defined by claim 1 wherein the last mentioned connection comprises an endless drive and a yieldable drive tautener.

4. Apparatus as defined by claim 1 wherein the tiltable support comprises a cam follower, and means normally constraining the follower into cam engagement and the plunger reel away from the mold reel.

5. Apparatus as defined by claim 1 wherein the tiltable support comprises a cam follower and a limited yieldable connection therebetween.

6. Apparatus as defined by claim 5 wherein there is provided means normally constraining the follower into cam engagement and the plunger reel away from the mold reel.

7. Apparatus as defined by claim 1 wherein the intermittent drive comprises a Geneva wheel and a rotator drive member.

8. Apparatus as defined by claim 7 wherein a reducing drive means operatively connects the rotator drive member to the constantly rotating power means.

JOHN B. SISSON.

REFERENCES CITED

The following references are of record in the file of this patent:

UNITED STATES PATENTS

| Number | Name | Date |
| --- | --- | --- |
| 430,701 | Smith | June 24, 1890 |
| 483,663 | Warren | Oct. 4, 1892 |
| 994,806 | Wanko | June 13, 1911 |
| 1,125,895 | Bingham | Jan. 19, 1915 |
| 1,125,916 | Schneider | Jan. 19, 1915 |
| 1,672,884 | Bristol | May 10, 1927 |
| 1,906,561 | Flexon | May 2, 1933 |
| 2,250,515 | Williams | July 29, 1941 |